United States Patent
Yamaguchi et al.

(10) Patent No.: US 11,156,275 B2
(45) Date of Patent: Oct. 26, 2021

(54) DRIVE DEVICE AND EXHAUST HEAT RECOVERY DEVICE

(71) Applicant: FUTABA INDUSTRIAL CO., LTD., Okazaki (JP)

(72) Inventors: Hiroki Yamaguchi, Okazaki (JP); Hirohisa Okami, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 306 days.

(21) Appl. No.: 16/341,237

(22) PCT Filed: Nov. 29, 2016

(86) PCT No.: PCT/JP2016/085362
§ 371 (c)(1),
(2) Date: Apr. 11, 2019

(87) PCT Pub. No.: WO2018/100625
PCT Pub. Date: Jun. 7, 2018

(65) Prior Publication Data
US 2019/0264785 A1    Aug. 29, 2019

(51) Int. Cl.
*F16H 19/00* (2006.01)
*F01N 5/02* (2006.01)
(Continued)

(52) U.S. Cl.
CPC .............. *F16H 19/001* (2013.01); *F01N 5/02* (2013.01); *F01N 13/08* (2013.01); *F02D 9/10* (2013.01);
(Continued)

(58) Field of Classification Search
CPC ............. F16H 19/001; F16H 2019/008; F16H 2019/046; F01N 5/02; F01N 13/08;
(Continued)

(56) References Cited

U.S. PATENT DOCUMENTS 3,768,325 A * 10/1973 Kucharski, Jr. ........... F16H 1/16
74/405
2002/0117863 A1   8/2002 Shinkawa
(Continued)

FOREIGN PATENT DOCUMENTS

CN     103968035 A    8/2014
CN     104379910 A    2/2015
(Continued)

OTHER PUBLICATIONS

Notification of Transmittal of Translation of the International Preliminary Report on Patentability, and International Preliminary Report on Patentability (Chapter 1 of Patent Cooperation Treaty) for International Application No. PCT/JP2016/085362 (Forms PCT/IB/338, PCT/IB/373, and PCT/ISA/237), dated Jun. 13, 2019, 6 pages in English.

(Continued)

*Primary Examiner* — Jacob M Amick
(74) *Attorney, Agent, or Firm* — Withrow & Terranova, P.L.L.C.; Vincent K. Gustafson

(57) ABSTRACT

The drive device drives a drive member and is provided with a power-side gear and a drive-side gear. The power-side gear is driven by a force output from a power source so as to drive the drive member in a range between a first stop position and a second stop position. In addition, the drive-side gear meshes with the power-side gear and transmits the force obtained from the power-side gear to the drive member. Also, the drive-side gear and the power-side gear are configured so as to disengage from each other when the drive member has reached the first stop position and/or the second stop position.

10 Claims, 6 Drawing Sheets

(51) Int. Cl.
*F01N 13/08* (2010.01)
*F02D 9/10* (2006.01)
*F16K 31/53* (2006.01)

(52) U.S. Cl.
CPC ............ *F02D 9/1065* (2013.01); *F16K 31/53* (2013.01); *Y02T 10/12* (2013.01)

(58) Field of Classification Search
CPC .......... F02D 9/10; F02D 9/1065; F16K 31/53; F16K 31/54
See application file for complete search history.

(56) References Cited

U.S. PATENT DOCUMENTS

| | | | |
|---|---|---|---|
| 2004/0060349 A1 | 4/2004 | Brendle et al. | |
| 2004/0164266 A1 | 8/2004 | Lutzer | |
| 2007/0102660 A1 | 5/2007 | Kouzu et al. | |
| 2015/0218997 A1* | 8/2015 | Kato | F28D 21/0003 165/103 |

FOREIGN PATENT DOCUMENTS

| CN | 104541031 A | 4/2015 |
|---|---|---|
| JP | H08219618 A | 8/1996 |
| JP | H102391 A | 1/1998 |
| JP | H11336940 A | 12/1999 |
| JP | 2001289071 A | 10/2001 |
| JP | 2002250164 A | 9/2002 |
| JP | 2003206953 A | 7/2003 |
| JP | 4900173 B2 | 3/2012 |
| JP | 2012149609 A | 8/2012 |
| JP | 2016113979 A | 6/2016 |
| WO | 2016098618 A1 | 6/2016 |

OTHER PUBLICATIONS

International Search Report for International Application No. PCT/JP2016/085362 (Form PCT/ISA/210), dated Jan. 31, 2017 (English, 2 pages).
Notice of Reasons for Refusal for Japanese Patent Application No. 2018-553532, dated Mar. 17, 2020, 6 pages including English translation.
First Office Action for Chinese Patent Application No. 201680091210.3, dated Aug. 25, 2020, 14 pages.
Second Office Action for Chinese Patent Application No. 201680091210.3, dated Apr. 30, 2021, 23 pages including English translation.

* cited by examiner

DRIVE DEVICE AND EXHAUST HEAT RECOVERY DEVICE

CROSS-REFERENCE TO RELATED APPLICATION(S)

This application claims the benefit of International Application No. PCT/JP2016/085362 filed on Nov. 29, 2017, wherein the entire disclosure of the foregoing application is hereby incorporated by reference herein.

TECHNICAL FIELD

The present disclosure relates to a drive device that drives a drive member by a force output from a power source, and an exhaust heat recovery device that includes such a drive device.

BACKGROUND ART

An exhaust heat recovery device is known which exchanges heat between an exhaust from an engine of a vehicle and a cooling fluid of the engine. In an exhaust heat recovery device of Patent Document 1, a flow path of an exhaust is switched by a motor in order to guide the exhaust to a heat exchanger upon heat exchange. Specifically, a rotation force output from the motor is transmitted to a valve by a sector gear so as to open and close the valve.

PRIOR ART DOCUMENTS

Patent Documents

Patent Document 1: Japanese Unexamined Patent Application Publication No. 2016-113979

SUMMARY OF THE INVENTION

Problems to be Solved by the Invention

However, in the exhaust heat recovery device of Patent Document 1, unless the motor is accurately controlled upon opening and closing the valve, the sector gear excessively rotates and hits the other members. As a result, noise may be generated, or the members may be damaged.

It is desirable that the members can be driven by simpler control.

Means for Solving the Problems

A drive device in one aspect of the present disclosure drives a drive member, and comprises a power-side gear and a drive-side gear. The power-side gear is driven by a force output from a power source so as to drive the drive member in a range between a first stop position and a second stop position. The drive-side gear meshes with the power-side gear and transmits the force obtained from the power-side gear to the drive member. The drive-side gear and the power-side gear are configured so as to disengage from each other when the drive member has reached at least one of the first stop position and the second stop position.

According to the configuration as such, when the drive member reaches the first or second stop position, the drive-side gear and the power-side gear disengage from each other. Therefore, even if driving of the power-side gear by the power source continues after the drive member has reached the stop position, the drive member stops at the stop position, and the drive-side gear stops at a position corresponding to the stop position. As a result, even if accuracy to control the power-side gear by the power source is low, the drive member and the drive-side gear are inhibited from being excessively driven. The members can be driven by simpler control.

The drive device may further comprise a restoration portion. The restoration portion drives the drive-side gear, which has disengaged by the drive member reaching at least one of the first stop position and the second stop position, in a direction to mesh with the power-side gear.

According to the configuration as such, the drive-side gear and the power-side gear that have disengaged from each other by the drive member reaching the first or second stop position can mesh with each other again. Therefore, the drive member located at the stop position can be driven again by driving the power-side gear by the power source.

The drive member may close an opening when located at one of the first stop position and the second stop position, and open the opening when located at the other position.

According to the configuration as such, the opening can be opened and closed by simpler control.

The drive device may be mounted on a vehicle.

According to the configuration as such, the members can be driven by simpler control in the vehicle.

The drive device may be provided in an exhaust heat recovery device including a heat exchanger that recovers heat from an exhaust discharged from an engine. The drive member may be located at the first stop position when causing the exhaust to flow into the heat exchanger to recover heat. Otherwise, the drive member may be located at the second stop position.

According to the configuration as such, whether to recover heat from the exhaust in the exhaust heat recovery device can be switched by simpler control.

In an exhaust heat recovery device in one aspect of the present disclosure recovers heat from an exhaust. The exhaust heat recovery device comprises a heat exchanger, a drive member, a power-side gear, and a drive-side gear. The heat exchanger recovers heat from the exhaust. The drive member is driven in a range between a first stop position and a second stop position. The power-side gear is driven by a force output from a power source to drive the drive member. The drive-side gear meshes with the power-side gear and transmits the force obtained from the power-side gear to the drive member. The drive member is located at the first stop position when causing the exhaust to flow into the heat exchanger to recover heat. Otherwise, the drive member is located at the second stop position. The drive-side gear and the power-side gear are configured so as to disengage from each other when the drive member has reached at least one of the first stop position and the second stop position.

According to the configuration as such, when the drive member reaches the first or second stop position, the drive-side gear and the power-side gear disengage from each other. Therefore, even if driving of the power-side gear by the power source continues after the drive member has reached the stop position, the drive member stops at the stop position, and the drive-side gear stops at a position corresponding to the stop position. As a result, even if accuracy to control the power-side gear by the power source is low, the drive member and the drive-side gear are inhibited from being excessively driven. Whether to recover heat from the exhaust can be switched by simpler control.

EXPLANATION OF REFERENCE NUMERALS

1 ... exhaust heat recovery device, 2 ... upstream exhaust pipe, 3 ... shell member, 4 ... heat exchanger, 5 ... valve, 6 ... motor, 7 ... valve opening and closing mechanism, 8 ... inhibition mechanism, 34a ... opening, 50 ... valve body, 52 ... valve shaft, 70 ... drive shaft, 71 ... worm, 73 ... sector gear, 73a ... first stop position 73b ... second stop position 74 ... elastic member, 76 ... torsion spring, 80 ... transmission member, 81 ... drive member, 81c ... first stop position 81d ... second stop position, 100 ... exhaust, 110 ... cooling fluid.

MODE FOR CARRYING OUT THE INVENTION

An example embodiment of the present disclosure will be described hereinafter by way of drawings. An embodiment of the present disclosure is not at all limited to the following embodiment, and can take various forms without departing from the technical scope of the present disclosure.

[Configuration of Exhaust Heat Recovery Device]

Figure 1:
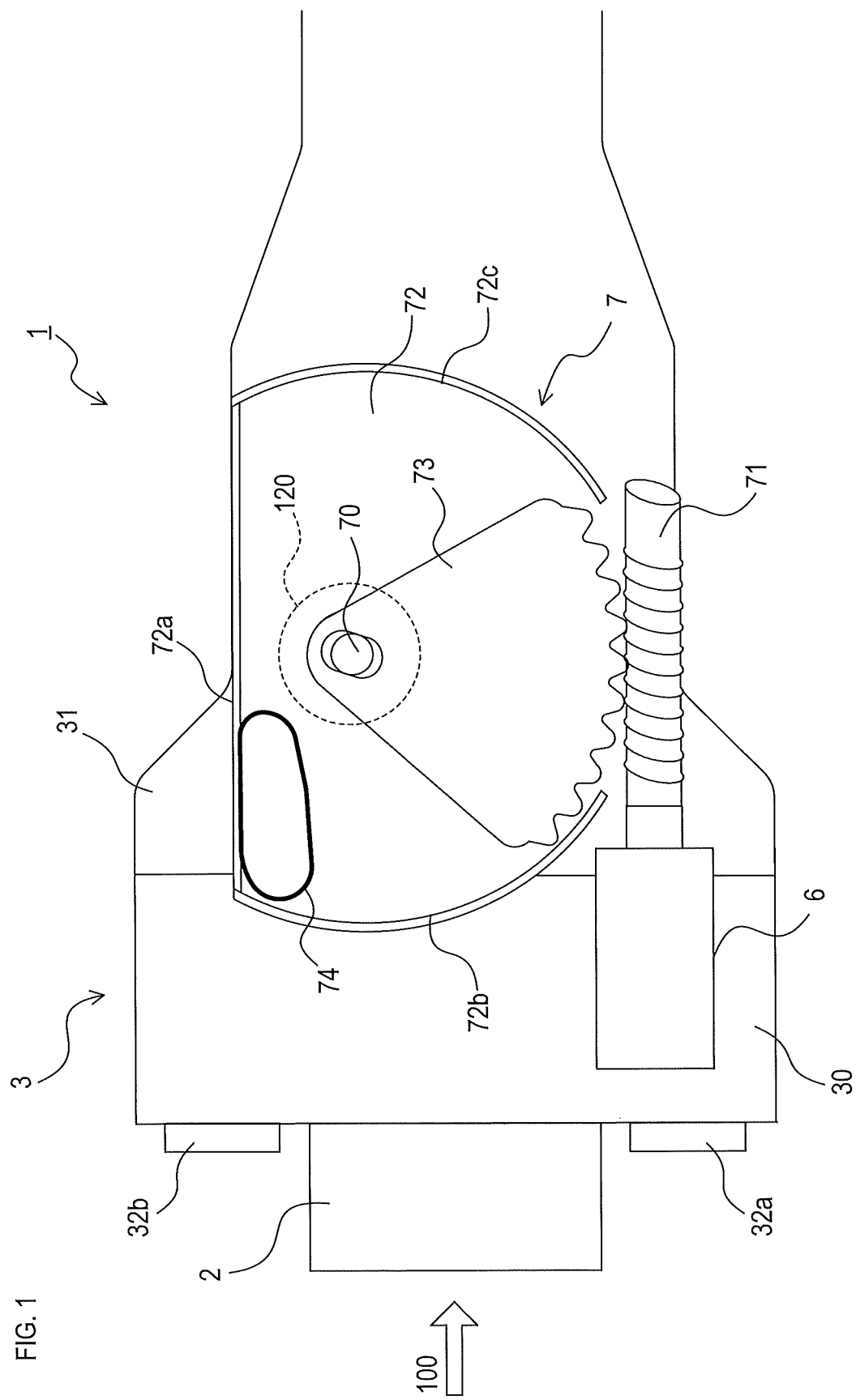
FIG. 1 is a side view showing a schematic configuration of an exhaust heat recovery device of the present embodiment.
Figure 2:
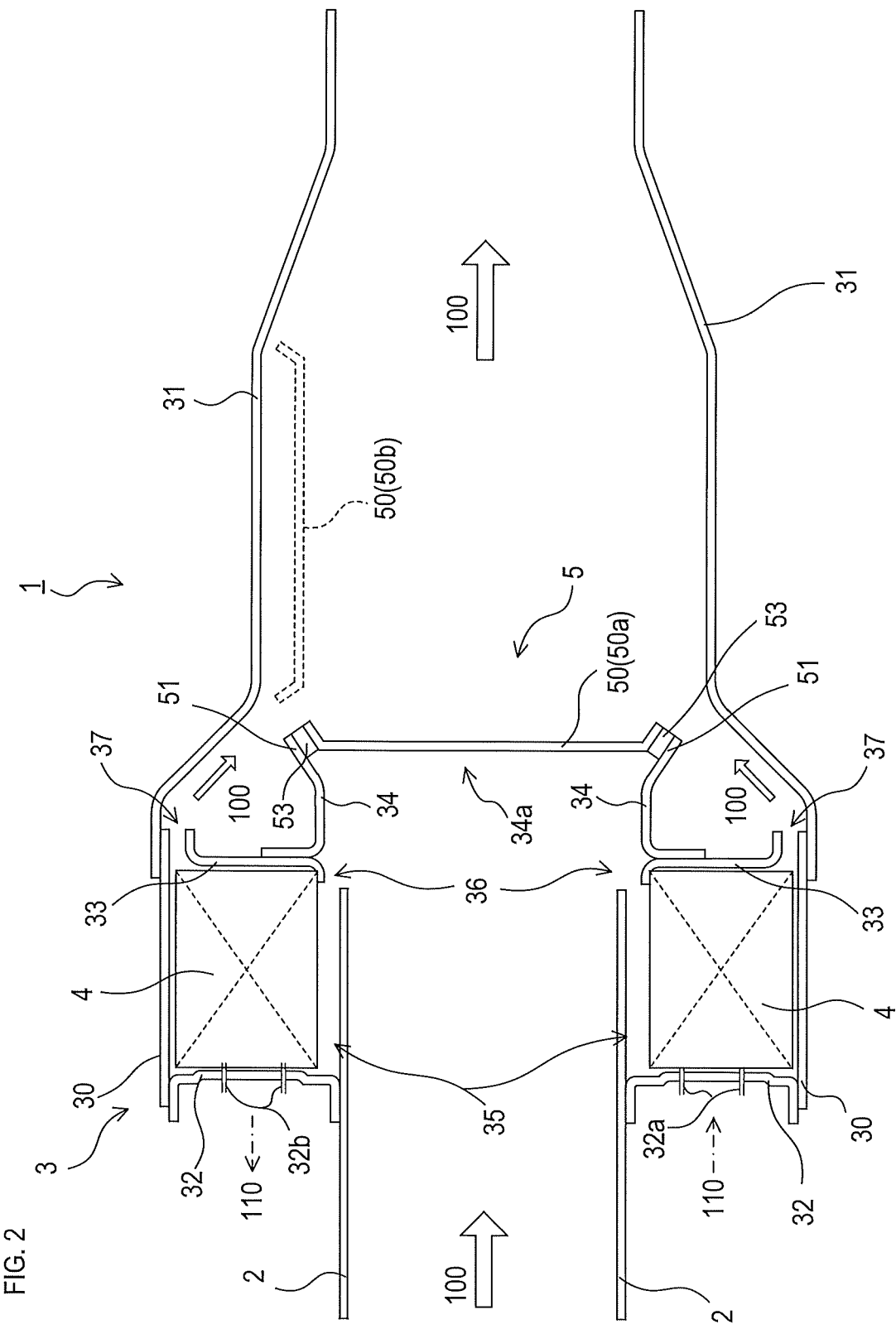
FIG. 2 is a sectional view of the exhaust heat recovery device of the present embodiment as seen from a side.

An exhaust heat recovery device 1 shown in FIGS. 1 and 2 is mounted on a moving body (for example, a vehicle) including an engine. The exhaust heat recovery device 1 recovers heat from an exhaust 100, which is a high temperature fluid discharged from the engine. Specifically, heat of the exhaust 100 is transmitted to a cooling fluid 110, which is a fluid having a lower temperature than the exhaust 100. The cooling fluid 110 is used for cooling the engine. The cooling fluid 110 may be, for example, cooling water or oil liquid.

Figure 3:
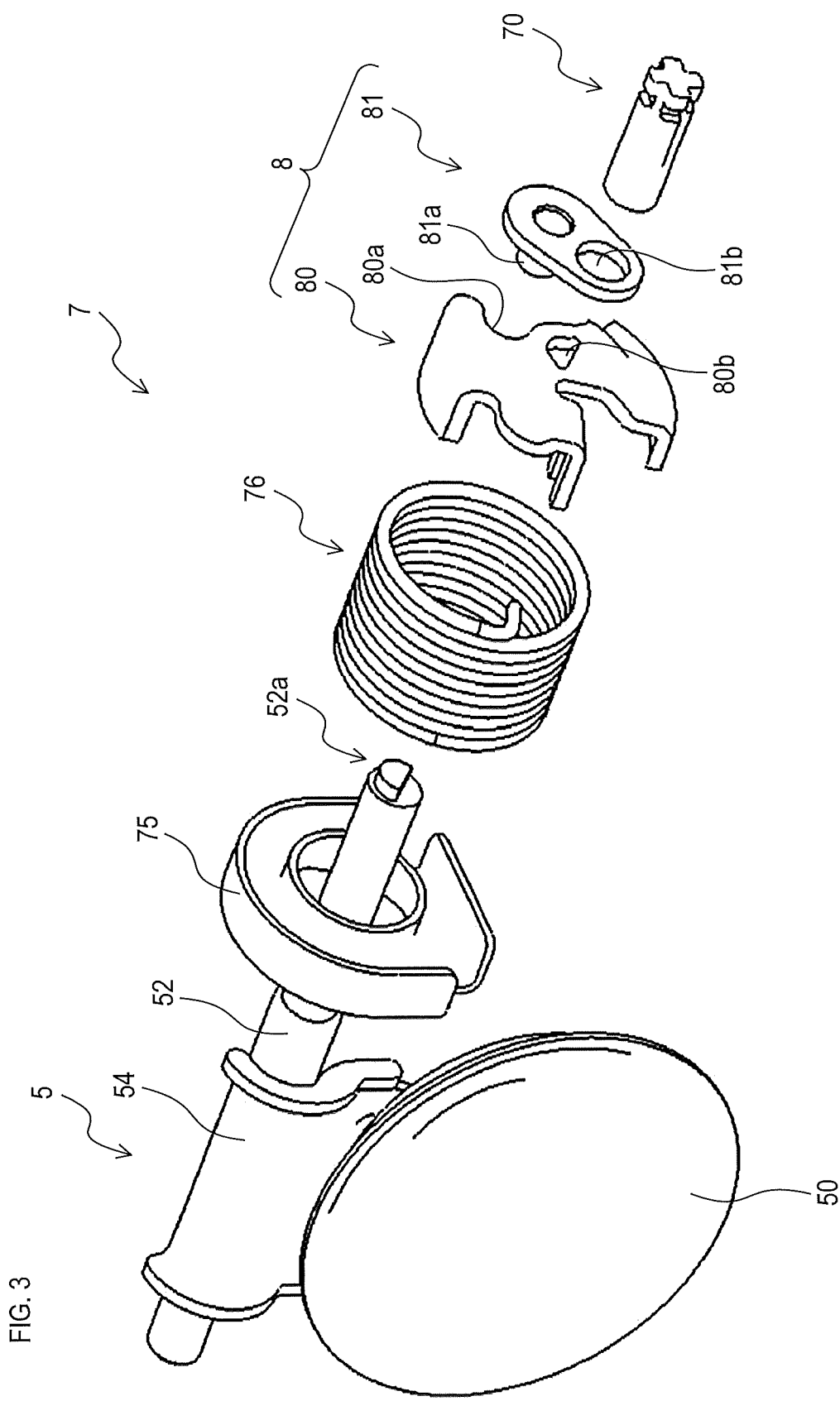
FIG. 3 is an exploded perspective view of a valve opening and closing mechanism and a valve of present embodiment.

The exhaust heat recovery device 1 comprises an upstream exhaust pipe 2, a shell member 3, a heat exchanger 4, a valve 5, a motor 6, and a valve opening and closing mechanism 7 shown in FIGS. 1 and 3. Hereinafter, a downstream side in a flow path of the exhaust 100 in the exhaust heat recovery device 1 is simply referred to as the downstream side, and an upstream side in the flow path is simply referred to as the upstream side.

The upstream exhaust pipe 2 is a tubular portion with open ends. The upstream exhaust pipe 2 guides the exhaust 100 to outside of the moving body. The upstream exhaust pipe 2, for example, has a cylindrical shape. One end of the upstream exhaust pipe 2 is connected to an exhaust pipe or an exhaust manifold, for example.

The shell member 3 covers outside of the upstream exhaust pipe 2. The shell member 3 includes an outer shell member 30, a downstream exhaust pipe 31, a lid member 32, a retaining member 33, and a guide member 34.

The downstream exhaust pipe 31 is a tubular portion with open ends.

The outer shell member 30 has a cylindrical shape with open ends. Also, the outer shell member 30 has an inner diameter larger than a diameter of the upstream exhaust pipe 2. The end on the downstream side of the outer shell member 30 is connected to the end on the upstream side of the downstream exhaust pipe 31. Also, the upstream exhaust pipe 2 is disposed inside the outer shell member 30. The outer shell member 30 surrounds the end on the downstream side of the upstream exhaust pipe 2 from a side.

The lid member 32 is disposed at an opening on the upstream side of the outer shell member 30. The lid member 32 closes a clearance between the outer shell member 30 and the upstream exhaust pipe 2 at the opening.

The retaining member 33 is disposed at an opening on the downstream side of the outer shell member 30. The retaining member 33 is disposed so as to cover a clearance between the outer shell member 30 and the upstream exhaust pipe 2 at the opening. A clearance (hereinafter, an inflow port 36) extending in a circumferential direction is provided between the retaining member 33 and the upstream exhaust pipe 2. A clearance (hereinafter, an outflow port 37) extending in the circumferential direction is also provided between the retaining member 33 and the outer shell member 30.

An annular space surrounded by the outer shell member 30, the lid member 32, the retaining member 33, and the upstream exhaust pipe 2 is a heat exchange chamber 35. A heat exchanger 4 is disposed in the heat exchange chamber 35. The heat exchanger 4 exchanges heat between the exhaust 100 and the cooling fluid 110. The retaining member 33 holds the heat exchanger 4 disposed in the heat exchange chamber 35.

The exhaust 100 flowing down the upstream exhaust pipe 2 can enter the heat exchange chamber 35 from the inflow port 36. The exhaust 100 that has entered the heat exchange chamber 35 flows into the heat exchanger 4. Then, the exhaust 100 flows out from the heat exchanger 4. Thereafter, the exhaust 100 passes through the outflow port 37 and flows out from the heat exchange chamber 35 to the downstream exhaust pipe 31.

Also provided are an inflow pipe 32a and an outflow pipe 32b that penetrate the lid member 32. The cooling fluid 110 flows into the heat exchanger 4 from the inflow pipe 32a. When the cooling fluid 110 passes through the heat exchanger 4, heat is exchanged between the cooling fluid 110 and the exhaust 100. Thereafter, the cooling fluid 110 flows out from the heat exchanger 4 via the outflow pipe 32b.

The guide member 34 has a cylindrical shape with open ends. The guide member 34 is disposed so as to protrude to the downstream side from the retaining member 33. In other words, the guide member 34 extends to the downstream side from around the opening on the downstream side of the upstream exhaust pipe 2.

The valve 5 is disposed on the downstream side of the inflow port 36, and opens and closes the flow path of the exhaust 100 (more specifically, an opening 34a on the downstream side of the guide member 34). The valve 5 includes a valve body 50, a valve seat 51, and a valve shaft 52.

The valve seat 51 is a portion corresponding to the end on the downstream side of the guide member 34. The valve seat 51 includes an edge of the opening 34a on the downstream side of the guide member 34. The valve seat 51 has a shape having an increased diameter toward the downstream side.

A mesh cushioning member 53 is attached to an inner circumferential surface of the valve seat 51.

The valve shaft 52 is connected to the valve body 50 by a connector 54. The valve shaft 52 is axially rotated by a rotation force output from the motor 6. The rotation force is transmitted from the motor 6 to the valve shaft 52 via the valve opening and closing mechanism 7. The valve shaft 52 drives the valve body 50 in a drive range between a closing position 50a and an opening position 50b by the axial rotation.

The valve body 50 is a disc-shaped member. The valve body 50 swings in the aforementioned drive range by the axial rotation of the valve shaft 52. When the valve 5 is closed, the valve body 50 is located at the closing position 50a. At this time, the valve body 50 is brought into contact with the valve seat 51 (more specifically, the cushioning member 53 provided in the valve seat 51). Also, at this time, the opening 34a surrounded by the valve seat 51 is closed. The cushioning member 53 absorbs an impact when the valve body 50 that has reached the closing position 50a hits the valve seat 51. When the valve 5 is opened, the valve body 50 located at the closing position 50a is displaced to the opening position 50b. As a result, the valve body 50 is separated from the opening 34a, and the opening 34a is opened.

When the valve 5 is closed, most of the exhaust 100 flows into the heat exchange chamber 35 from the inflow port 36. In other words, heat is exchanged between the exhaust 100 and the cooling fluid 110. On the other hand, when the valve 5 is opened, most of the exhaust 100 does not head to the inflow port 36, and flows out from the opening 34a on the downstream side of the guide member 34 to the downstream exhaust pipe 31.

The motor 6 generates a rotation force that opens and closes the valve 5. The rotation force is transmitted from the motor 6 to the valve shaft 52 by the valve opening and closing mechanism 7. Hereinafter, a direction to displace the valve 5 to close is referred to as a closing direction. Also, a direction to displace the valve 5 to open is referred to as an opening direction.

[Configuration of Valve Opening and Closing Mechanism]

The valve opening and closing mechanism 7 includes a worm 71, a protection member 72, a sector gear 73, an elastic member 74, a drive shaft 70, an inhibition mechanism 8, a torsion spring 76, and a spring holder 75, shown in FIGS. 1 and 3. The drive shaft 70, the inhibition mechanism 8, the torsion spring 76, and the spring holder 75 are disposed on the shell member 3 side of the protection member 72. A dashed area 120 in FIG. 1 indicates an area where these members are disposed.

The spring holder 75 has a hole through which the valve shaft 52 is inserted. The spring holder 75 fixes an end on the valve 5 side of the torsion spring 76. The spring holder 75, for example, may be of metal.

The torsion spring 76 (in other words, the torsion coil spring) is fixed to the spring holder 75 at the end of the valve 5 side, and is connected to the transmission member 80 of the inhibition mechanism 8 at an end on the drive shaft 70 side. The end on the drive shaft 70 side of the torsion spring 76 is displaced by rotation of the transmission member 80. The torsion spring 76 is attached in a manner such that a force to rotate the transmission member 80 in the closing direction of the valve 5 is generated at all time.

The worm 71 is disposed coaxially with a rotation axis of the motor 6. The worm 71 is axially rotated by the motor 6. The worm 71 also functions as a worm gear together with the sector gear 73.

The sector gear 73 functions as a worm wheel driven by the force obtained from the worm 71. The sector gear 73 rotates around the drive shaft 70. Specifically, the sector gear 73 rotates between a first stop position 73a shown in FIG. 4A and a second stop position 73b shown in FIG. 4B. When the sector gear 73 has reached the first stop position 73a and when the sector gear 73 has reached the second stop position 73b, the sector gear 73 and the worm 71 disengage from each other. In other words, teeth of the sector gear 73 and the worm 71 are adjusted so that the sector gear 73 and the worm 71 disengage from each other when the sector gear 73 reaches these stop positions.

The sector gear 73 is fixed to the drive shaft 70. The drive shaft 70 axially rotates with rotation of the sector gear 73. The drive shaft 70 is disposed coaxially with the valve shaft 52. Axial rotation of the drive shaft 70 is transmitted to the valve shaft 52 via the inhibition mechanism 8. In other words, rotation of the sector gear 73 causes the valve shaft 52 to axially rotate. Axial rotation of the valve shaft 52 opens and closes the valve 5. When the sector gear 73 is located at the first stop position 73a, the valve body 50 is located at the closing position 50a. On the other hand, when the sector gear 73 is located at the second stop position 73b, the valve body 50 is located at the opening position 50b. The detail will be described later.

The protection member 72 is disposed adjacent to the worm 71 on a side surface of the exhaust heat recovery device 1. The protection member 72 surrounds the sector gear 73, the elastic member 74, and the like. Frames 72a to 72c are provided at an edge of the protection member 72. The frame 72a is located opposite to the worm 71, and extends linearly. On the other hand, the frames 72b, 72c each have an arc shape. Each of the frames 72b, 72c extends from an opposite end of the linear frame 72a to the worm 71 side.

The sector gear 73 and the elastic member 74 are disposed inside the frames 72a to 72c. The sector gear 73 rotates along the arc-shaped frames 72b, 72c. The sector gear 73 is not brought into contact with the linear frames 72a when located at the first stop position 73a and the second stop position 73b. On the other hand, no frame is provided at a portion of the protection member 72 adjacent to the worm 71. At that portion, the worm 71 meshes with the sector gear 73.

Figure 4A:
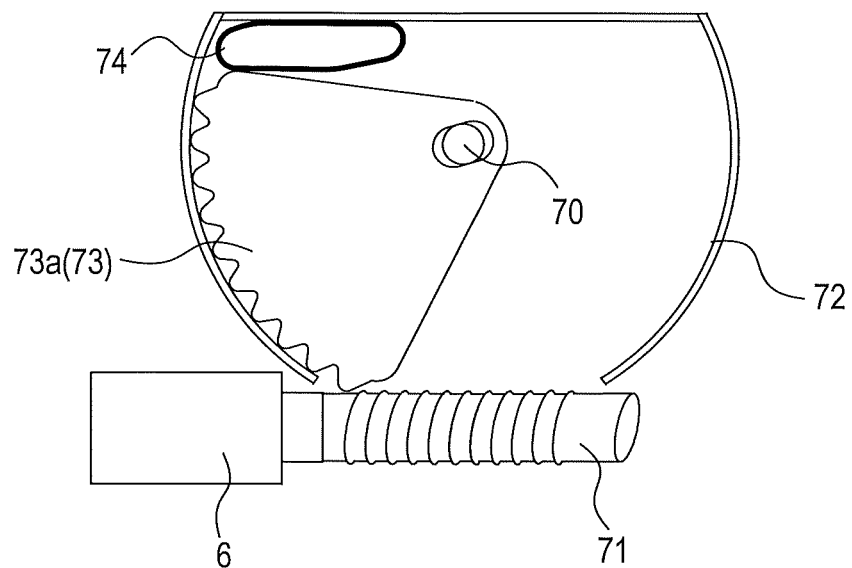
FIG. 4A is an explanatory view showing a first stop position of a sector gear in the valve opening and closing mechanism of the present embodiment.
Figure 4B:
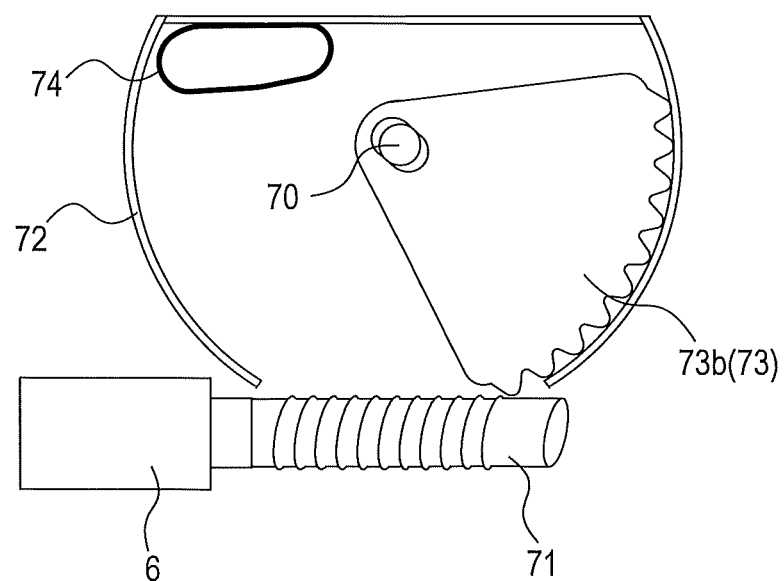
FIG. 4B is an explanatory view showing a second stop position of the sector gear.

The elastic member 74 is attached to the upstream side of the linear frame 72a. The elastic member 74 may be, for example, a leaf spring, a coiled spring, rubber or resin, which has elasticity. As shown in FIG. 4A, the sector gear 73 that has reached the first stop position 73a compresses the elastic member 74. As a result, the elastic member 74 drives the sector gear 73 to rotate in the opening direction. Therefore, the sector gear 73, after reaching the first stop position 73a and disengaging from the worm 71, rotates in the opening direction. Thus, meshing of the sector gear 73 and the worm 71 is restored. More specifically, the sector gear 73 and the worm 71 come to a state immediately before disengagement. Thus, the sector gear 73, after reaching the first stop position 73a and when driven by the worm 71, rotates in the opening direction.

As described above, the torsion spring 76 of the inhibition mechanism 8 constantly drives the transmission member 80 to rotate in the closing direction of the valve 5. Therefore, a force to rotate in the closing direction (in other words, a direction of the first stop position 73a) is applied to the sector gear 73 that has reached the second stop position 73b and disengaged from the worm 71. As a result, the sector gear 73 that has reached the second stop position 73b rotates in the closing direction, and meshing of the sector gear 73 and the worm 71 is restored. More specifically, the sector gear 73 and the worm 71 come to a state immediately before disengagement. Thus, the sector gear 73, after reaching the second stop position 73b and when driven by the worm 71, rotates in the closing direction.

[Configuration of Inhibition Mechanism]

The inhibition mechanism 8 inhibits an external force applied to the valve 5 from being applied to the motor 6 via the valve opening and closing mechanism 7. As shown in FIG. 3, the inhibition mechanism 8 includes a transmission member 80 and a drive member 81.

The transmission member 80 has a curved portion 80a and a hole portion 80b.

The curved portion 80a is meshes with a pin 81a of the later-described drive member 81. The curved portion 80a has a shape corresponding to the pin 81a. In the present embodiment, for example, the curved portion 80a is curved in U-shape. The curved portion 80a is provided at a certain distance away from the hole portion 80b.

An end 52a on the drive shaft 70 side of the valve shaft 52 is inserted to the hole portion 80b. The end 52a is fixed to the hole portion 80b, and the transmission member 80 and the valve shaft 52 rotate together.

The drive member 81 includes the pin 81a and a hole portion 81b.

The drive shaft 70 is inserted to the hole portion 81b, and the drive shaft 70 is fixed to the hole portion 81b. Therefore, the drive member 81 and the drive shaft 70 rotate together.

The pin 81a is a cylindrical portion and protrudes on the transmission member 80 side. The pin 81a is disposed at a certain distance away from the hole portion 81b. Therefore, when the drive member 81 rotates with axial rotation of the drive shaft 70, the pin 81a rotates around the drive shaft 70.

[Opening and Closing of Valve]

Opening and closing operation of the valve 5 via the inhibition mechanism 8 will now be described.

Figure 5A:
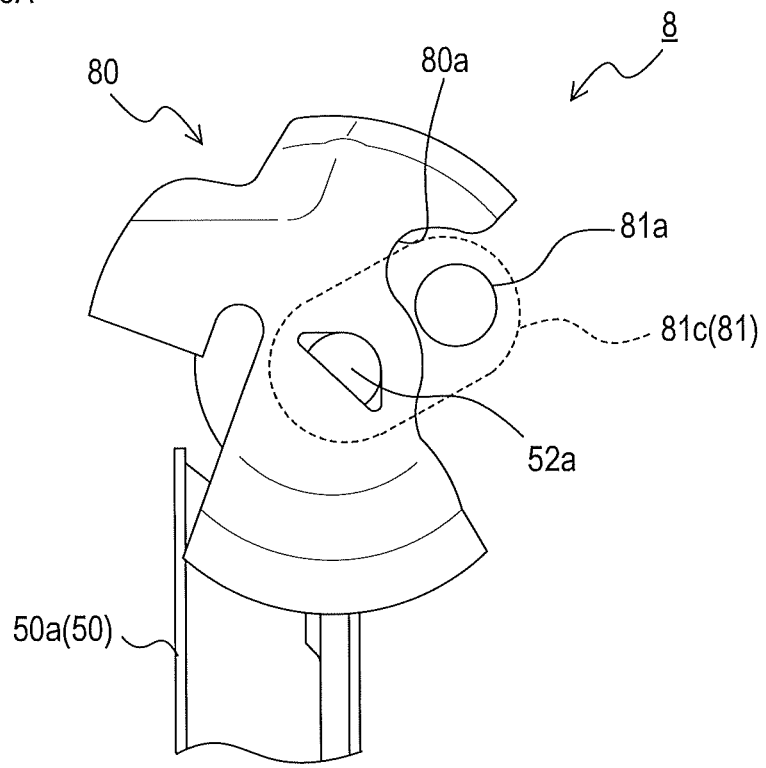
FIG. 5A is an explanatory view showing a first stop position of a drive member in an inhibition mechanism of the present embodiment.

As shown in FIG. 5A, when the valve 5 is closed and the valve body 50 is located at the closing position 50a, the drive member 81 is located at the first stop position 81c. Therefore, the exhaust 100 is urged to flow into the heat exchanger 4. At this time, the sector gear 73 is located at the first stop position 73a. Also, at this time, there is a clearance between the pin 81a of the drive member 81 and the transmission member 80.

When the exhaust 100 temporarily has an increased pressure at the time of closing the valve 5, the valve body 50 is pushed to the downstream side and the valve 5 is slightly opened. At this time, a rotation force in the opening direction is applied from the valve body 50 to the valve shaft 52 and the transmission member 80. However, since there is a clearance between the pin 81a and the transmission member 80, the rotation force in the opening direction is not transmitted from the transmission member 80 to the drive member 81.

Figure 5B:
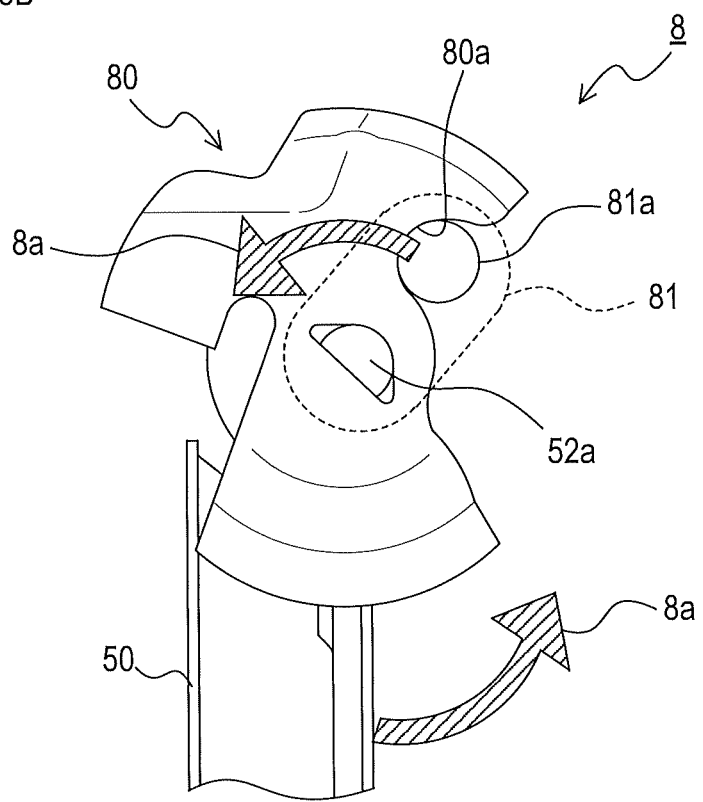
FIG. 5B is an explanatory view showing the drive member being rotated toward a second stop position.

When the valve 5 is opened, the drive member 81 rotates in an opening direction 8a (in other words, a counterclockwise direction in FIG. 5B) by the force transmitted from the sector gear 73. At this time, the pin 81a of the drive member 81 is brought into contact with the curved portion 80a of the transmission member 80, and the rotation force is transmitted to the valve shaft 52. In other words, both the transmission member 80 and the valve shaft 52 rotate in the opening direction 8a. As a result, the valve body 50 rotates in the opening direction 8a and is separated from the valve seat 51.

Figure 6:
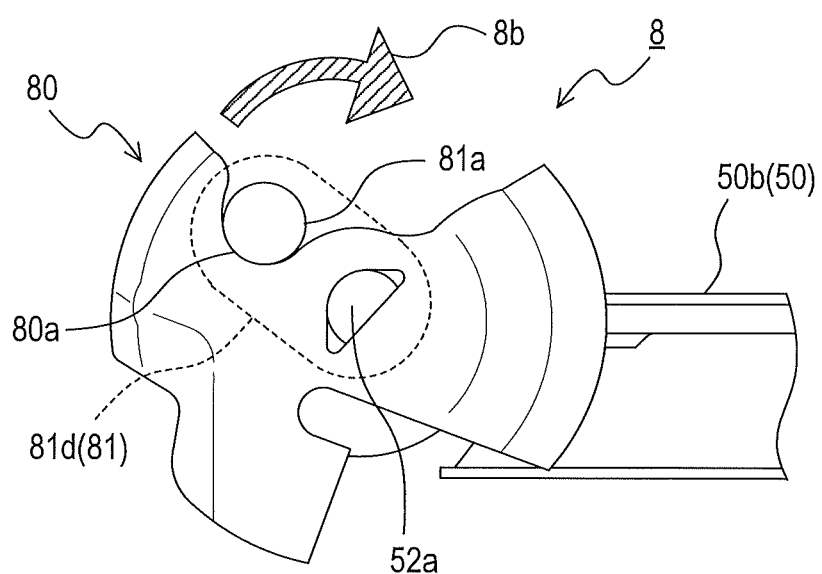
FIG. 6 is an explanatory view showing the second stop position of the drive member in the inhibition mechanism of the present embodiment.

Thereafter, when the sector gear 73 reaches the second stop position 73b, the drive member 81 reaches the second stop position 81d, as shown in FIG. 6. At this time, the valve body 50 reaches the opening position 50b. In other words, when the exhaust 100 is not urged to flow into the heat exchanger 4, the drive member 81 is located at the second stop position 81d.

When the drive member 81 is located at the second stop position 81d, a rotation force in the closing direction 8b (in other words, a clockwise direction in FIG. 6) is applied from the torsion spring 76 to the transmission member 80. The rotation force is transmitted to the drive member 81 via the curved portion 80a and the pin 81a. By the rotation force, the sector gear 73 located at the second stop position 73b rotates in the closing direction. As a result, as described above, meshing of the sector gear 73 and the worm 71 is restored.

Upon closing the valve 5, the drive member 81 rotates in the closing direction 8b by the force transmitted from the sector gear 73. Therefore, the drive member 81 rotates toward the first stop position 81c, and consequently, the pin 81a is separated from the curved portion 80a of the transmission member 80. Then, by a force from the torsion spring 76, the transmission member 80 and the valve shaft 52 rotate in the closing direction 8b, and the valve body 50 is displaced toward the closing position 50a.

[Effects]

(1) In the exhaust heat recovery device 1 of the present embodiment, when the drive member 81 reaches the first or second stop position 81c, 81d, the sector gear 73 and the worm 71 disengage from each other. Therefore, even if the motor 6 continues to rotate after the drive member 81 has reached the stop position, the drive member 81 stops at the stop position, and the sector gear 73 stops at the first or second stop position 73a, 73b. Thus, even if accuracy to control the worm 71 by the motor 6 is low, excessive driving of the drive member 81 and the sector gear 73 is inhibited. As a result, for example, the sector gear 73 is inhibited from hitting the other members. The members can be driven by simpler control.

(2) The valve opening and closing mechanism 7 includes the elastic member 74 and the torsion spring 76. With these members, the sector gear 73 and the worm 71, that have disengaged from each other by the drive member 81 reaching the first or second stop position 81c, 81d, can mesh with each other again. Therefore, by driving the worm 71 by the motor 6, the drive member 81 located at one of the stop positions can be driven again toward the other stop position.

(3) In the exhaust heat recovery device 1, the opening 34a of the guide member 34 is opened and closed by the valve opening and closing mechanism 7. Thus, the opening 34a can be opened and closed by simpler control. Also, whether to recover heat from the exhaust 100 can be switched by simpler control.

(4) The exhaust heat recovery device 1 is mounted on a moving body such as a vehicle. Therefore, the valve opening and closing mechanism 7 can drive the members by simpler control in the vehicle.

Other Embodiments (1) In the valve opening and closing mechanism 7 of the exhaust heat recovery device 1 of present embodiment, the rotation force of the motor 6 is transmitted to the valve body 50 via the sector gear 73, the worm 71, the drive member 81 and the like. As a result, the valve 5 is opened and closed. The sector gear 73 and the worm 71 disengage from each other when the drive member 81 reaches the first stop position 81c and the sector gear 73 reaches the first stop position 73a. These gears also disengage from each other when the drive member 81 reaches the second stop position 81d and the sector gear 73 reaches the second stop position 73b. However, these gears may disengage from each other in one of the above conditions, and meshing may be maintained in the other condition.

(2) In the valve opening and closing mechanism 7, the sector gear 73 and the worm 71 are used to transmit the rotation force of the motor 6 to the valve body 50. However, the force may be transmitted to the valve body 50 in the same manner by a combination of two gears of a different type from the combination of the above gears. Also, in the exhaust heat recovery device 1, the valve 5 is opened and closed by the motor 6. The valve 5 may be opened and closed by an actuator other than a motor. Specifically, in such cases, the force may be transmitted to the valve body 50 in the same manner by a combination of two gears of a different type from the combination of the above gears. In case of using the combination of two gears of the different type as well, these gears disengage from each other when the drive member 81 reaches the first stop position 81c and/or the second stop position 81d, as in the present embodiment.

(3) In the valve opening and closing mechanism 7, the sector gear 73 that has reached the first stop position 73a is driven in the opening direction by the elastic member 74. Therefore, the sector gear 73 that has disengaged from the worm 71 again meshes with the worm 71. Also, the sector gear 73 that has reached the second stop position 73b is driven in the closing direction by the torsion spring 76. Therefore, the sector gear 73 that has disengaged from the worm 71 again meshes with the worm 71.

The valve opening and closing mechanism 7 may not be provided with the elastic member 74. Also, the valve opening and closing mechanism 7 may be configured so that the torsion spring 76 does not drive the sector gear 73 in the closing direction. Further, in the above configuration, the sector gear 73 may be provided with a weight. In such a case as well, the sector gear 73 that has reached the first stop position 73a or the second stop position 73b can be rotated in the opening direction or the closing direction by its own weight or a weight of the weight. As a result, the sector gear 73 and the worm 71 mesh with each other again.

(4) The valve opening and closing mechanism 7 may not include the inhibition mechanism 8 and the like. The valve shaft 52 of the valve 5 may be axially rotated directly by the sector gear 73.

(5) In the exhaust heat recovery device 1 of the present embodiment, whether to urge the exhaust 100 to flow into the heat exchanger 4 is switched by driving the valve body 50 by the valve opening and closing mechanism 7 and the like to open and close the flow path of the exhaust 100. However, whether to urge exhaust 100 to flow into the heat exchanger 4 may be switched by simply displacing the valve body 50 by the valve opening and closing mechanism 7 and the like without opening and closing the flow path of the exhaust 100.

(6) The exhaust heat recovery device 1 of the present embodiment is mounted on a moving body such as a vehicle. However, the exhaust heat recovery device 1 may be mounted on a device other than the moving body.

(7) A device including the same configuration as the drive shaft 70, the worm 71, the sector gear 73, the elastic member 74, and the drive member 81 in the valve opening and closing mechanism 7 of the present embodiment (hereinafter, drive device) may be provided in a device other than the exhaust heat recovery device 1, or in an in-vehicle device other than the exhaust heat recovery device 1. Also, for example, in a device other than the exhaust heat recovery device 1, the opening may be opened or closed by driving the drive member 81 by the drive device. Of course, the drive device may be used other than opening and closing of the opening.

[Correspondence with Claims]

The configuration including the drive shaft 70, the worm 71, the sector gear 73, and the elastic member 74 in the exhaust heat recovery device 1 of the present embodiment corresponds to an example of a drive device. The motor 6 corresponds to an example of a power source. The worm 71 corresponds to an example of a power-side gear. The sector gear 73 corresponds to an example of a drive-side gear. The elastic member 74 and the torsion spring 76 correspond to an example of a restoration portion.

The invention claimed is:

1. A drive device that drives a drive member, the drive device comprising:
 a power-side gear driven by a force output from a power source so as to drive the drive member in a range between a first stop position and a second stop position; and
 a drive-side gear that meshes with the power-side gear and transmits the force obtained from the power-side gear to the drive member;
 the drive-side gear and the power-side gear being configured so as to disengage from each other when the drive member has reached at least and the second stop position;
 the drive member being configured to displace a valve body that opens and closes an opening;
 the valve body being compressed at all times by an elastic member, and the drive member, which is located at the second stop position, being compressed by the elastic member toward the first stop position; and
 the drive-side gear being configured to be displaceable in a range between a first position and a second position such that:
  the drive-side gear and the power-side gear disengage from each other when the drive-side gear reaches the second position and then the drive member reaches the second stop position; and
  the drive-side gear, which has reached the second position, is displaced toward the first position by the drive member compressed by the elastic member, to thereby restore meshing of the drive-side gear with the power-side gear.

2. The drive device according to claim 1, further comprising:
 a restoration portion that drives the drive-side gear, which has disengaged by the drive member reaching the first stop position, in a direction to mesh with the power-side gear.

3. The drive device according to claim 1,
 wherein the drive device is mounted on a vehicle.

4. The drive device according to claim 1,
 wherein the drive device is provided in an exhaust heat recovery device including a heat exchanger that recovers heat from an exhaust discharged from an engine; and
 wherein the drive member is located at one of the first stop position or the second stop position when causing the exhaust to flow into the heat exchanger to recover heat, and otherwise the drive member is located at the other of the first stop position or the second stop position.

5. An exhaust heat recovery device that recovers heat from an exhaust, the exhaust heat recovery device comprising:
a heat exchanger that recovers heat from the exhaust; and
the drive member according to claim 1,
the drive member being located at one of the first stop position or the second stop position when causing the exhaust to flow into the heat exchanger to recover heat, and otherwise the drive member being located at the other of the first stop position or the second stop position.

6. The drive device according to claim 2, wherein the drive device is mounted on a vehicle.

7. The drive device according to claim 2,
wherein the drive device is provided in an exhaust heat recovery device including a heat exchanger that recovers heat from an exhaust discharged from an engine; and
wherein the drive member is located at one of the first stop position or the second stop position when causing the exhaust to flow into the heat exchanger to recover heat, and otherwise the drive member is located at the other of the first stop position or the second stop position.

8. The drive device according to claim 3,
wherein the drive device is provided in an exhaust heat recovery device including a heat exchanger that recovers heat from an exhaust discharged from an engine; and
wherein the drive member is located at one of the first stop position or the second stop position when causing the exhaust to flow into the heat exchanger to recover heat, and otherwise the drive member is located at the other of the first stop position or the second stop position.

9. The drive device according to claim 6,
wherein the drive device is provided in an exhaust heat recovery device including a heat exchanger that recovers heat from an exhaust discharged from an engine;
wherein the drive member is located at one of the first stop position or the second stop position when causing the exhaust to flow into the heat exchanger to recover heat, and otherwise the drive member is located at the other of the first stop position or the second stop position.

10. The drive device according to claim 1,
wherein the drive-side gear and the power-side gear are configured so as to disengage from each other when the drive member has reached the first stop position;
wherein the drive device further comprises:
a restoration portion including an elastic member that drives the drive-side gear, which has disengaged by the drive member reaching the first stop position, in a direction to mesh with the power-side gear; and
a frame portion in which the drive-side gear is disposed;
wherein the drive-side gear is configured as a sector gear such that the drive-side gear and the power-side gear disengage from each other when the drive-side gear reaches the first position and then the drive member reaches the first stop position;
wherein the restoration portion is disposed inside the frame portion and is configured to be compressed by an end surface of the drive-side gear, which has reached the first position, and to rotate the drive-side gear toward the second position in response to compression, to thereby restore the meshing of the drive-side gear with the power-side gear; and
wherein the end surface of the drive-side gear extends in a radial direction of the drive-side gear and is located closer to the first position in a circumferential direction of the drive-side gear than it is closer to the second position.

* * * * *